United States Patent [19]

Seydelmann

[11] 3,934,827
[45] Jan. 27, 1976

[54] DIE FOR TWO-STAGE FOOD CHOPPER
[76] Inventor: Ludwig Seydelmann, 1, Holderlinstra, 7 Stuttgart, Germany
[22] Filed: Sept. 3, 1974
[21] Appl. No.: 502,751

[30] Foreign Application Priority Data
Sept. 3, 1973  Germany............................ 2344284

[52] U.S. Cl................................ 241/84; 241/82.3
[51] Int. Cl.² ........................................ A47J 43/07
[58] Field of Search ....... 241/82.1, 82.2, 82.5, 82.7, 241/84

[56]  References Cited
UNITED STATES PATENTS
3,018,715  1/1962  McCleary et al. ............. 241/82.7 X
3,529,646  9/1970  Pavia ................................. 241/82.5

*Primary Examiner*—Roy Lake
*Assistant Examiner*—E. F. Desmond
*Attorney, Agent, or Firm*—Karl F. Ross; Herbert Dubno

[57]  ABSTRACT

A die for use in a food chopper downstream of the coarse-cut die is formed with an array of like small-diameter holes and on each of its faces with an array of grooves having a width substantially greater than the diameter of the through-going holes and extending at an angle to the blade which sweeps over the upstream face of this die. Particles which have passed through the upstream die and which are unable to pass through the small-diameter holes in the downstream die are caught in the grooves and cut between the downstream edge of the grooves and the cutter blade. These grooves are arrayed such that the cutter blade conducts the food along the grooves, and the grooves may be of decreasing depth in the direction of travel of the material therealong so as to allow the material to be reduced to very small size. At the inner ends the grooves may terminate in large-diameter throughgoing holes which are connected to an arrangement for carrying unchoppable particles out of the chopper.

13 Claims, 7 Drawing Figures

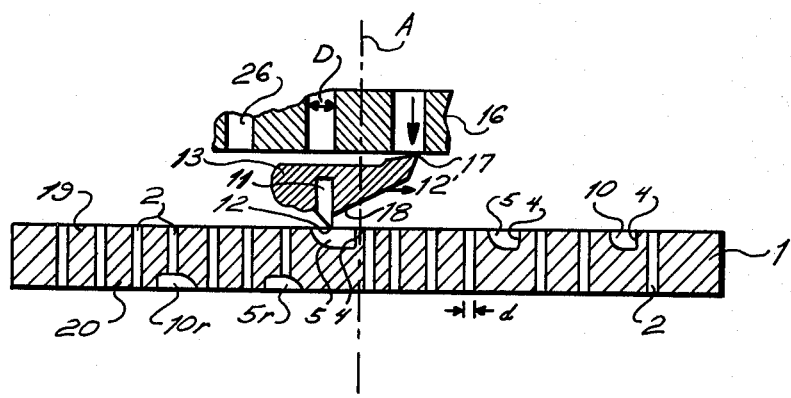
FIG. 3
FIG. 4
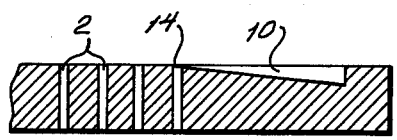
FIG. 5
FIG. 6
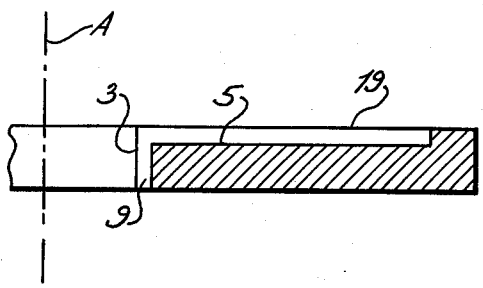
FIG. 7
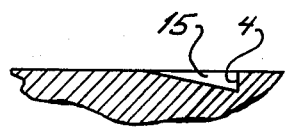

DIE FOR TWO-STAGE FOOD CHOPPER

CROSS-REFERENCE TO RELATED APPLICATION

The present application is related to my copending patent application Ser. No. 302,725 filed on Nov. 1, 1972 for a FOOD CHOPPER, now U.S. Pat. No. 3,847,360 issued November 12, 1974.

FIELD OF THE INVENTION

The present invention relates to a die for a food chopper.

This invention also concerns a die and chopper-blade configuration usable in a food chopper as described in my above-mentioned patent application.

BACKGROUND OF THE INVENTION

There is known a type of food chopper having a conveyor in the form of an auger which presses food to be chopped axially against a face of a cutter die which is formed with an array of large-diameter holes. A cutter blade immediately adjacent the upstream face of this cutter blade serves to sever off pieces of the food being chopped which are forced into the holes so that pieces are pressed through these holes which have a size generally corresponding to the diameter of the holes. Downstream of this die and spaced therefrom is another cutter die formed with an array of holes having a much smaller diameter than those of the upstream die. A chopper blade is rotatable between the confronting surfaces of these parallel dies so that the intermediate-size chunks passing through the upstream die are reduced to smaller size and presses through the downstream die.

A considerable disadvantage of such a system is that pieces of bone or similarly hard material are able to pass through the upstream die but are then swept along the upstream surface of the downstream die, as they cannot fit into the small-diameter holes therein and are therefore not reducible by the blade. After some period of time of being swept around, this mass of hard pieces must be removed from the chopper, as it at least partially blocks the flow passage between the upstream and downstream dies. No successful arrangement has been proposed which eliminates the problem of comminuting or chopping hard pieces which pass through the upstream die in a two-stage chopper but which are unable to fit into the perforations in the downstream die.

OBJECTS OF THE INVENTION

It is therefore an object of the present invention to provide an improved food chopper.

Another object is the provision of an improved food-chopper die which overcomes the above-given disadvantage.

Yet another object is the provision of such a die which allows even relatively hard materials such as bone or the like to be chopped at the downstream die.

SUMMARY OF THE INVENTION

These objects are attained according to the present invention in a die having an array of small-diameter throughgoing holes and formed on at least the upstream surface thereof with at least one groove extending noncircumferentially to the rotation axis of the blade relative to the die or the die relative to the blade. This groove according to the present invention is elongated and has a thickness which is substantially greater than the diameter of the bores in the die. Indeed in accordance with the invention the thickness of the groove corresponds generally to the diameter of the throughgoing holes in the die immediately upstream from this die.

Thus in accordance with the present invention hard pieces of material which have passed through the upstream die but which are unable to fit into the holes of the downstream die are wedged in this groove so that the cutter blade can reduce their size considerably.

In accordance with a further feature of this invention an array of such grooves is provided on the die. The grooves extend nonradially to the die and nonparallel to the cutter blades or blade. Thus the food pieces caught in these grooves will be moved radially in one direction or the other.

According to yet another feature of the invention there is provided, at least one end of each of the grooves, a throughgoing hole which can either be of large diameter so as to allow the hard unchoppable pieces to be collected and disposed of, or of small diameter so as to allow the partially chopped pieces to be pressed through the die and mixed with the normally chopped material.

In accordance with yet another feature of this invention the grooves have relative to the direction of sweep thereover of the cutting blades a downstream edge which forms a right angle to the surface of the die and therefore provides a sheer edge which coacts with the blade. These grooves also are each of relatively great depth at one end and of relatively shallow depth at the other end, this other end being that end to which food chunks are displaced by the cutter blade so that large-diameter pieces become wedged in the one end of the grooves and as they are chopped and reduced in size they move along toward the other end thereof. The above-mentioned small-diameter throughgoing holes are advantageously provided at this shallow end.

The food chopper according to the present invention is extremely advantageous in that even chunks of bone and the like when mixed with meat can readily be chopped up to a relatively small particle size. This allows bird food or cat food to be prepared without having constantly to stop the chopper to remove hard pieces therefrom. It is also possible in accordance with the invention to separate out the large-diameter hard pieces so as to form chopped meat free of gristle, bone, and the like.

BRIEF DESCRIPTION OF THE DRAWING

The above and other objects, features, and advantages will become more readily apparent from the following description, reference being made to the accompanying drawing in which:

FIGS. 2 – 6 are sections taken along lines II — II to VI — VI of FIG. 1, respectively; and FIG. 7 is a detail sectional view illustrating a feature of the present invention.

SPECIFIC DESCRIPTION

Figure 1:
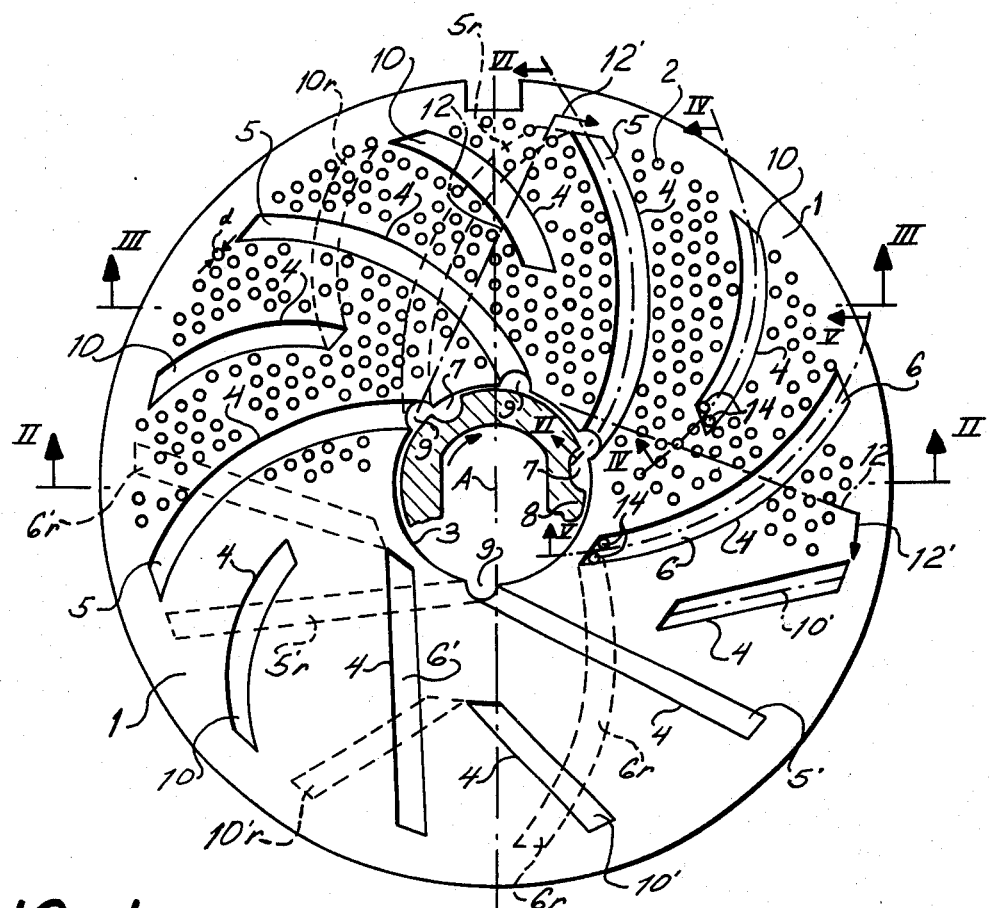
FIG. 1 is a plan view of a die according to the present invention.
Figure 2:
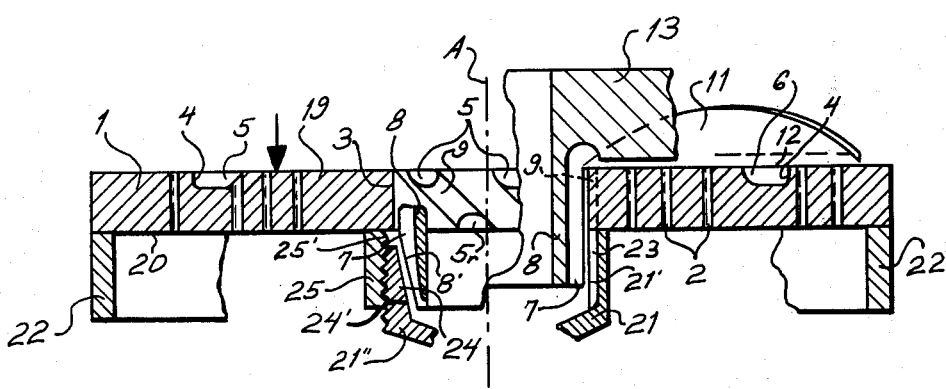

FIG. 1 shows a circular disk die 1 made of tooled steel and formed with an array of like holes 2 having small diameters $d$ and with a central hole 3. The upstream face of this die disk 1 is formed with a plurality of grooves 5, 6, and 10 all having downstream flanks 4 which lie as best seen in FIGS. 2 and 3 at right angles to the planar upstream face of die disk 1.

The shaft or hub 8 of a cutter 13 projects through the hole 3 and this hub 8 is formed with several grooves 7 extending in line with the hub axis A. The grooves 5, which are circularly arcuate and have relative to the direction of displacement of blade 13 a center of curvature located angularly upstream, terminate at notches 9 in the hole 3 so as to allow food particles being displaced inwardly along these grooves 5 to pass through the matching notches 9 and grooves 7 to a collector where they are removed from the apparatus.

The grooves 6, which are circularly arcuate like the grooves 5, terminate radially outwardly of the central hole 4 and are provided at their radially inward ends with small-diameter holes 14 identical to the holes 2. In addition, as shown in FIG. 5, the grooves 6 taper inwardly toward holes 14. FIG. 6 shows how the grooves 5 are of like depth from the upstream face 19 of the die 1.

The cutting edges 12 of the blade 13 are not radial to the axis A, as described in my abovementioned copending patent application. These edges 12 extend as shown in FIG. 1 substantially tangentially to the hub 8 so that the pieces being cut in the grooves 5, 6 and 10 are moved radially inwardly in these grooves by the cutting edge 12.

Provided upstream of the die 1 as shown in FIG. 3 is a die 16 having throughgoing perforations 26 of a diameter D substantially greater than that of the bores 2. The blade 13 had one edge 17 which is over the downstream face of the die 16 and is provided with blades 11 which are displaced in direction 12' to sweep over and cut with the face 19 of the die 1. Inclined surfaces 18 on the downstream face of the blade 13 serve to press material to be ground against the face 19 and thereby insure efficient operation.

In accordance with this invention the face 20 opposite the face 19 of the die 1 is similarly formed with grooves 5r, 6r and 10r similar to the grooves 5,6 and 10, so that the disk 1 may be reversed when face 19 wears, thereby giving disk 1 double the normally expected service life.

The face 19 is also formed with straight grooves 5' and 10', the former terminating at notches 9 and the latter terminating radially outwardly of the central hole 3. Similar matching grooves 5'r and 10'r are provided on the face 20. The grooves 5' and 10' are perfectly straight and form an angle of approximately 45° with the cutting edge 12.

It is also possible as shown in FIG. 7 to form grooves 15 of generally right-triangular section in the disk 1, with the hypotenuse of the triangle forming the base of the groove so that the sides lie on the face of the die and the downstream flank thereof.

The bore 3 can be continued as shown in FIG. 2 at 21' into the cap 21 or into a sleeve 25 formed with threads 25' engaged with a cap 21'' having an inner surface formed with grooves 24. The surface 24 is frustoconical to match the hub surface 8' so as to grind the hard chips in this cap thoroughly. A conduit is provided to carry the chips away from the cap 21''. Screwing of cap 21'' adjusts the spacing between the surfaces 24 and 8'.

I claim:

1. A die for a food chopper, said die comprising a metallic plate having a pair of opposite faces and formed with an array of throughgoing bores of like diameter extending between said faces, one of said faces being formed with at least one elongated groove having a width greater than the diameters of said bores, said food chopper pressing material to be chopped against said one face and having a blade rotated about an axis perpendicular to said face to sweep over said one face, said groove being inclined to said blade during sweeping of said blade over said groove.

2. A die for a food chopper, said die comprising a metallic plate having a pair of opposite faces and formed with an array of throughgoing bores of like diameter extending between said faces, one of said faces being formed with at least one elongated groove having a width greater than the diameters of said bores, said food chopper pressing material to be chopped against said one face and having a blade rotated about an axis perpendicular to said face to sweep over said one face, said groove being inclinded to said blade during sweeping of said blade over said groove, said plate being a disk having a center at the axis of rotation of said blade and said groove being oriented such that said blade advances said material in said groove relative to said axis, said groove being of decreasing depth in the direction of advance of said material therein.

3. The die defined in claim 2 wherein said groove is generally arcuate.

4. The die defined in claim 2 wherein said groove is generally straight.

5. The die defined in claim 2 wherein said groove is tapered toward said axis.

6. The die defined in claim 2 wherein said groove terminates at its shallowest end at one of said throughgoing bores.

7. The die defined in claim 2 wherein said plate is formed on both of said faces with at least one such groove.

8. The die defined in claim 2 wherein said groove is generally arcuate.

9. The die defined in claim 2 wherein said groove is generally straight.

10. The die defined in claim 2 wherein said plate is formed on both of said faces with at least one such groove.

11. The die defined in claim 9 wherein said plate is formed on each of said faces with an array of such grooves.

12. The die defined in claim 10 wherein said plate is formed on each of said faces with an array of such grooves.

13. A die for a food chopper, said die comprising a metallic plate having a pair of opposite faces and formed with an array of throughgoing bores of like diameter extending between said faces, one of said faces being formed with at least one elongated groove having a width greater than the diameters of said bores, said food chopper pressing material to be chopped against said one face and having a blade rotated about an axis perpendicular to said face to sweep over said one face, said groove being inclined to said blade during sweeping of said blade over said groove, said plate being a disk formed with a central hole lying on the axis of rotation of said blade, said groove extending to and opening at said central hole.

* * * * *